Nov. 7, 1961  C. N. KIMBERLIN, JR., ET AL  3,007,545
METHOD OF EXTRACTING HYDROCARBONS
Filed Dec. 21, 1955
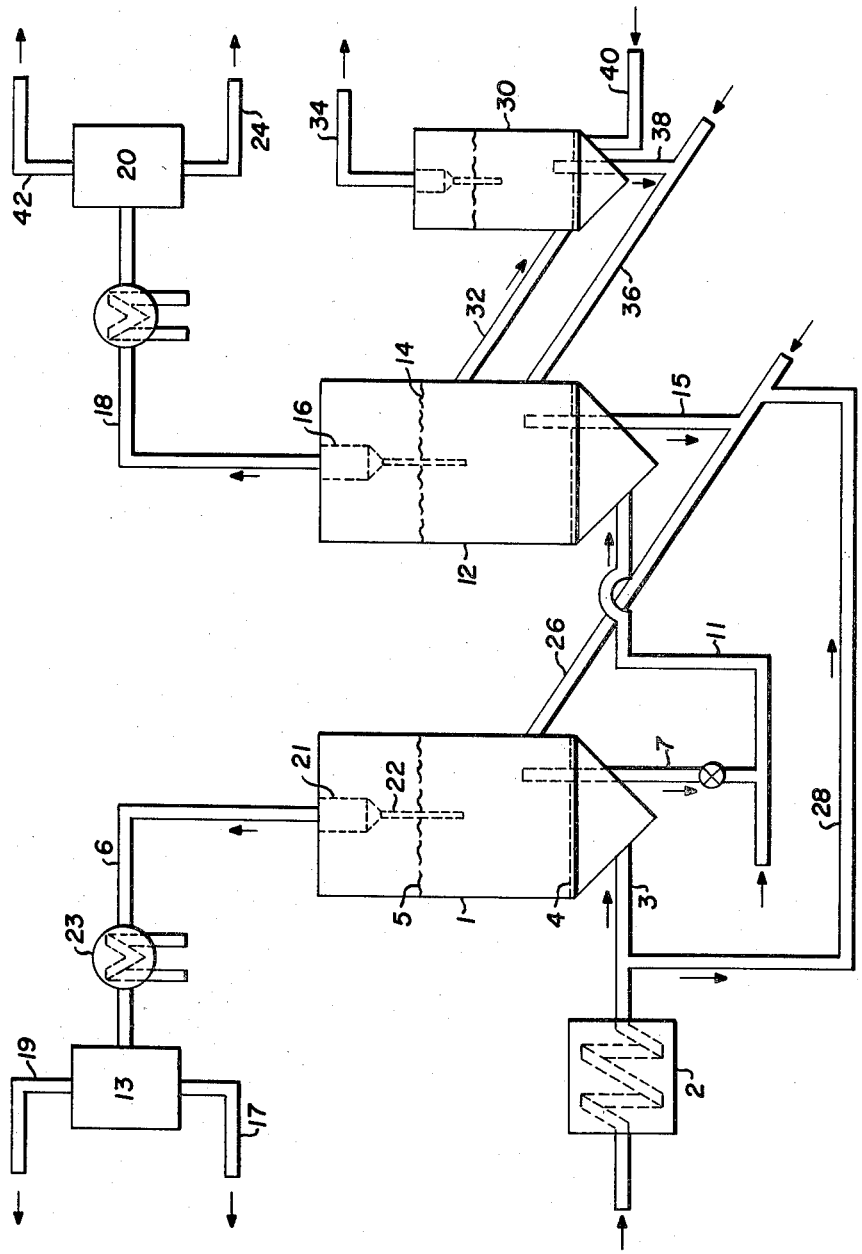
Charles N. Kimberlin, Jr.
William J. Mattox  Inventors
By Richard H. Nagel  Attorney

United States Patent Office 3,007,545
Patented Nov. 7, 1961

3,007,545
METHOD OF EXTRACTING HYDROCARBONS
Charles Newton Kimberlin, Jr., and William Judson Mattox, Baton Rouge, La., assignors to Esso Research and Engineering Company, a corporation of Delaware
Filed Dec. 21, 1955, Ser. No. 554,565
8 Claims. (Cl. 183—114.2)

The present invention relates to a process for separating straight chain hydrocarbons, paraffinic and olefinic, from mixtures thereof with branch chain, cyclic or aromatic hydrocarbons by a method which may be operated continuously, expeditiously and cheaply. More particularly, the present invention relates to a novel process for effecting separations of straight chain hydrocarbon molecules from isomeric branch chain, cyclic, or aromatic compounds employing a class of natural or synthetic adsorbents termed, because of their crystalline patterns, molecular sieves. Still more particularly, the present invention relates to an improved method for this separation process employing the sieves in the form of a fluidized mass of powdered adsorbent material.

It has been known for some time that certain natural and synthetic zeolites have the property of selectively adsorbing normal hydrocarbons from the isomeric branch chain compounds. These zeolites have crystal patterns forming structures containing a large number of small cavities interconnected by a number of still smaller holes or pores. These pores are of exceptional uniformity of size. Only molecules small enough to enter the pores can be adsorbed. These pores may vary from less than 3 to more than 15 Angstrom units, but for any one zeolite the pores are of substantially uniform size.

The scientific and patent literature contains numerous references to the adsorbing action of natural and synthetic zeolites. Among the natural zeolites having this sieve property may be mentioned chabasites and analcite. Synthetic zeolites have also been prepared and are described, for instance, in U.S. Patent 2,442,191. Zeolites vary somewhat in composition but generally contain silicon, aluminum, oxygen and an alkaline earth and/or alkali metal element, e.g. sodium and/or calcium, magnesium, etc. Analcite has the empirical formula

Barrer (U.S. Patent 2,306,610) teaches that all or part of the sodium is replaceable by calcium to yield a molecular sieve having the formula $CaNa_2Al_2Si_4O_{12} \cdot 2H_2O$. In U.S. Patent 2,442,191 a synthetic zeolite with molecular sieve properties having the empirical formula

is described. Further description of these zeolites is found in the article "Molecular Sieve Action of Solids," appearing in Quarterly Reviews, vol. III, pp. 293–330 (1949), published by the Chemical Society (London).

The separation of normal from branch chain, cyclic, or aromatic compounds and their mixtures has become an increasingly important industrial problem. Thus, motor fuels which contain appreciable amounts of normal paraffins have low octane numbers, while on the other hand, segregation of certain straight chain components from mixtures with branch chain isomers makes available preferred starting or intermediate products. Thus, olefinic mixtures of branch and straight chain components are not nearly as satisfactory a feed to the olefin carbonylation process as straight chain compounds. Many other examples might be cited.

The present invention involves the separation of straight chain paraffins and olefins from other hydrocarbons with which they are mixed by causing the vaporized mixture to contact a fluidized mass of finely divided molecular sieve material. A particularly preferred sieve material of this type is prepared by mixing sodium aluminate and a sodium silicate, preferably the metasilicate, to form the crystalline sodium-aluminum silicate, thereafter effecting base exchange with a soluble calcium, magnesium or other appropriate metal ion, and dehydrating under conditions which preserve the crystalline structure. Such a sieve has a pore diameter of about 5 Angstrom units.

The present invention involves further the recovery of the adsorbed n-paraffins from the sieves by a novel fluidized stripping means, and means whereby the sieves may be maintained in a continuous state of high adsorptive capacity.

Referring now to the drawing, reference numeral 1 represents an adsorption zone which may be in the form of a cylindrical vessel equipped with a perforated grid 4 for effecting good distribution of gases and a cyclone separator 21 for removal of entrained solids for return by dip pipe 22 to the dense phase fluidized bed. The hydrocarbon mixture, which for the purpose of the present embodiment may be a narrow cut light virgin naphtha containing substantial amounts of n-hexane and n-heptane, as well as isomeric hexanes and heptanes, is passed into adsorber 1 through preheater-vaporizer 2 and line 3. The sieve is maintained in the form of a dense turbulent fluidized mass or bed by controlling the upward velocity of the gases within the range of 0.3 to 5.0 feet per second. The finely divided molecular sieve is in the form of a powder having a particle size preferably in the range of from 100 to 400 mesh.

In adsorption vessel 1 the temperature is preferably maintained in the range of from about 100 to 500° F. and the pressures from atmospheric to 500 p.s.i.g. Heating means, such as closed steam coils (not shown) may be provided in the adsorber. Under these conditions, the vapors pass upwardly through the fluidized bed, which has an upper level 5. The normal hydrocarbons are adsorbed in this bed, while the branch chained and cyclic constituents pass through unadsorbed and are withdrawn through line 6. This product, free of n-hydrocarbons, is a high octane fuel blending agent or component, or a high quality hydroformer feed stock.

The molecular sieve material containing the n-paraffin is withdrawn downwardly through line 7 projecting into the bottom of adsorber 1 and thence discharged into a stripping gas in line 11 to form a suspension which is carried into desorption tower 12. In a preferred embodiment of the present invention, the stripping gas is olefinic, preferably a gas containing substantial amounts of propylene. Butylenes may also be employed. Cracked refinery gases, containing these as well as saturated gases may be employed. The olefins only, as will be seen, are involved in the desorption step. Paraffinic low molecular weight gases have little desorption activity, for they have little affinity for the sieve pores.

In desorption unit 12, by controlling the gas velocities as in adsorption zone 1, a dense fluidized bed or mass of the sieve material in desorption gas is maintained, which dense suspension has a reasonably well-defined upper level 14. In this zone, which preferably is maintained at a temperature not far different from that in the adsorption zone and which may be in the range from about 200 to 600° F., the olefinic gaseous desorbent replaces the adsorbed n-paraffins in the sieve interstices without requiring the high temperatures necessary when using such means as steam or inert gas stripping, which frequently causes sieve deterioration. The unadsorbed gaseous paraffins constituents of the desorbing gas, as well as the desorbed n-paraffins, pass upwardly through cyclone separator 16 and thence, after cooling, if desired, through line 18 to separation zone 20. Overhead are recovered readily the uncondensed gases, while the normal paraffinic hydrocarbons may be withdrawn through line 24 and may be subjected to catalytic reforming or other conversion process.

After the olefinic gas, such as propylene, has displaced the n-paraffins, as may be determined by appearance of substantial amounts of olefin in the effluent from unit 12, the solids now saturated with propylene or butylenes are withdrawn through aerated standpipe 15 and returned as a suspension in aeration gas to vessel 1 for renewing the cycle. As gas for this purpose there may be employed a portion of the vaporized naphtha feed passed via lines 28 and transfer line 26. The olefin is in turn replaced in vessel 1 by the n-paraffins in the feed. The mixture of gaseous olefins and unadsorbed isoparaffins and cyclic compounds passes upwardly through line 6, and may be cooled in cooler 23, and separated readily, as by flashing or simple distillation, in separator 13. The olefins pass upwardly through line 19 and are recovered in a high degree of purity. They are thus readily utilizable for alkylation or polymerization. The isoparaffins, cycloparaffins, and aromatics are withdrawn through line 17 and comprise a fuel of high anti-knock value.

Another and substantially isothermal means of desorbing the n-paraffins in tower 12 is to employ, instead of gaseous propylene and/or butylene, a hydrocarbon fraction having n-paraffinic constituents with either one or two more, or one or two less, carbon atoms than the n-paraffin to be replaced. In this embodiment, the vaporized desorbent is passed into vessel 12 through line 11, suspending the molecular sieve introduced through line 7. When a light narrow cut virgin naphtha is the feed to vessel 1, the desorbent may well be a heavy narrow cut fraction of the same naphtha, containing substantial amounts of n-$C_8$ and $C_9$. In this case, the separation in zone 20, here a still, would involve the recovery of the n-$C_6$ and $C_7$ as overhead, and heavy isoparaffins, etc. as a bottoms product. Similarly the n-$C_8$ and $C_9$ would be recovered in the bottoms from separation zone 13, and light iso $C_6$ and $C_7$ in the overhead through line 19.

An important element of the present invention relates to treatment of the sieves during the process to maintain adsorption capacity. Particularly when operating a fluid solids adsorption process with molecular sieves for separating hydrocarbon types, the retention of small amounts of water and other polar compounds, such as sulfur-containing materials picked up from the feed stream by the sieves, eventually results in decreased adsorption capacity. These components have a higher affinity for the sieve pores than hydrocarbons, and hence are not desorbed by replacement. The build-up of these difficultly desorbable materials is usually relatively slow, but their accumulation will ordinarily require periodic interruptions to permit sieve reactivation.

In accordance with this embodiment of the present invention, these interruptions are avoided by withdrawing continuously or intermittently a small side stream, comprising 1 to 10% of the material in desorber 12, through aerated line 32 to heating vessel 30, wherein the withdrawn solids are preferably maintained in a fluidized state as described in connection with vessels 1 and 12. Heat and fluidizing gases are provided through line 40. Hot flue gas, air, or other gas stream is admitted into vessel 30 to supply heat and act as flushing medium. The gases preferably are at a temperature of about 700–850° F. and residence time is maintained for a period sufficient to desorb polar contaminants. This may be of the order of 10 to 120 seconds. Hydrocarbons, such as methane or ethane may also be used for this reactivation purpose, particularly where minimum transfer of non-hydrocarbon gases to desorption vessel 12 is desired. Alternatively, the reactivated sieves may be stripped with hydrocarbon vapor, as through line 38, prior to return to desorption vessel 12 via line 36. The suspending gas in line 36 is preferably the same desorbing medium as that employed in 12.

The importance of this step is shown below. In a cyclic evaluation in which n-heptane was separated from toluene by adsorption with a molecular sieve having a pore diameter of 5 A. followed by desorption of the n-$C_7$ with propylene, 10 cycles with feed and displacement olefin containing small amounts of water normally present (i.e. not chemically dried) resulted in a 15% decline in adsorption capacity. Heating the sieves to 850° F. in ambient air completely restored the adsorptive capacity both before and during the cycle in which propylene displacement was used for n-heptane separation. This may be tabulated as follows:

| Sieve Usage | Sieve Capacity for n-$C_7$, Percent of Original |
|---|---|
| (1) Fresh Sieves—Before $C_3H_6$ Displacement | 100 |
| (2) Fresh Sieves—After 1st Cycle with $C_3H_6$ Displacement | 87 |
| (3) After 10 Cycles with Undried Feed—$C_3H_6$ Displacement | 72 |
| (4) After Heating at 850° F.—Before $C_3H_6$ Displacement | 100 |
| (5) After Heating at 850° F.—Av. of 6 Cycles with $C_3H_6$ Displacement | 85 |

It will be noted that the capacity shown on line 4 is equal to that of line 1 and that on line 5 equivalent to line 2.

The process of the present invention may be modified in many directions without departing from its spirit. Thus the process may be employed with molecular sieves having pore diameters from less than 4 to 15 and more Angstrom units, depending upon the size of the molecules and molecular types to be separated. Thus this process is particularly adapted to the separation and concentration of olefins from cracked gases. The olefins in this case are the "adsorbed" phase, and the n-paraffins the desorbent. Propylene is adsorbed from cracked gas, whereas the corresponding propane is not readily adsorbed in a 5 Angstrom sieve. The desorbent is a $C_6$–$C_7$ normal paraffin. In the case of the butenes, a similar type of "balanced" adsorption-desorption process is attained when n-$C_8$ and n-$C_9$ are used as desorbents.

Separation and purification of ethylene from admixtures with gaseous impurities requires several modifications. A sieve having somewhat smaller pore diameter, of about 4–5 Angstrom units is preferred in this service. Similarly, the desorbent is preferably a $C_3$, $C_4$ or $C_5$ n-paraffin, but no higher. Adsorption in vessel 1 is advantageously carried out in a feed stream freed of $C_3$ and higher hydrocarbons and at pressures from atmospheric to about 1000 p.s.i., preferably to 500 p.s.i. The temperature obtaining in the adsorption and desorption zones is dependent upon the boiling point of the $C_3$–$C_5$ desorbent at the pressure used for olefin displacement. It is about 10–15° F., and not more than 100° F. above the boiling point of the paraffin for both the adsorption and desorption cycles, and should be within the approximate range of 40–200° F.

Though in general the temperatures in both the adsorption and desorption zones are of the same order of magnitude, nonetheless under certain conditions temperature differentials may be desirable. Thus the adsorber may be operated at 450° F. and below, while desorption may take place at higher temperatures, but less than 750° F. Under these circumstances, the sieve adsorbent streams in circulating between the two zones are heat exchanged by passage through a circulating shot system. These heat carrying particles, which may be mullite, are of such size as to permit rapid elutriation of the fluidized adsorbent.

What is claimed is:
1. A continuous process for separating straight chain hydrocarbons from a mixture thereof with hydrocarbons of other types which comprises: passing the vapor stream of said hydrocarbon mixture into a fluidized solids adsorption zone; passing into said zone fluidizable, finely divided zeolites having molecular sieve properties and having adsorbed thereon a hydrocarbonaceous stripping gas; maintaining a dense turbulent bed of said particles in said zone; selectively adsorbing straight chain hydrocarbons from said mixture in the interstices of said zeolites and concomitantly replacing said stripping gas; maintaining in said zone a temperature of from about 100 to about 500° F.; continuously removing overhead from said zone unadsorbed hydrocarbons and said replaced stripping gas; continuously withdrawing said zeolites containing said straight chain hydrocarbons from a lower portion of said zone; suspending said withdrawn, finely divided solids in a stream of said stripping gas; passing said stream and suspended material into a desorption zone; maintaining a bed of said solids fluidized by said stripping gas in said desorption zone; stripping said straight chain hydrocarbons from said zone and concomitantly replacing said stripped hydrocarbons in the interstices of said zeolites by said stripping gas; maintaining a suitable temperature of from about 200 to about 600° F. in said desorption zone so as to favor adsorption of said stripping gas, withdrawing overhead from said zone stripped straight chain hydrocarbons; continuously withdrawing said finely divided zeolites and adsorbed stripping gas-containing hydrocarbons from said desorption zone; suspending said solids in a stream of vaporized hydrocarbons comprising straight chain hydrocarbons; and passing said suspension to said initial zone.

2. The process of claim 1 wherein said stripping gas comprises olefins.

3. The process of claim 2 wherein said stripping gas comprises propylene.

4. The process of claim 1 wherein said stripping gas is a n-paraffin containing hydrocarbon stream wherein said n-paraffins differ by no more than two carbon atoms from the number of carbon atoms of the n-paraffins comprising said first-named hydrocarbon mixture.

5. The process of claim 1 wherein substantially the same temperature prevails in said adsorption and desorption zones.

6. The process of claim 1 wherein the zeolites are maintained at a high activity by periodically withdrawing a minor portion of said zeolites from said desorption zone, passing said withdrawn solids to a fluidized regeneration zone, passing a stream of heated gas through a bed of said zeolites at a temperature not greater than about 850° F. for a period sufficient to desorb polar contaminants, withdrawing regenerated zeolites, and passing said zeolites to said adsorption-desorption system.

7. The process of claim 6 wherein 1–10% of said sieves are withdrawn from said desorption zone and passed to said regeneration zone.

8. The process of claim 6 wherein said regeneration zone is at a substantially higher temperature than said desorption zone.

References Cited in the file of this patent

UNITED STATES PATENTS

| | | |
|---|---|---|
| 2,079,158 | De Rachat | May 4, 1937 |
| 2,306,610 | Barrer | Dec. 29, 1942 |
| 2,396,709 | Leffer | Mar. 19, 1946 |
| 2,442,191 | Black | May 25, 1948 |
| 2,493,911 | Brandt | Jan. 10, 1950 |
| 2,522,426 | Black | Sept. 12, 1950 |
| 2,529,289 | Gilliland | Nov. 7, 1950 |
| 2,564,717 | Olsen | Aug. 21, 1951 |
| 2,653,960 | Hess et al. | Sept. 29, 1953 |
| 2,666,500 | Cahn | Jan. 19, 1954 |
| 2,702,826 | Kirshenbaum et al. | Feb. 22, 1955 |
| 2,793,713 | Fritz et al. | May 28, 1957 |
| 2,818,455 | Ballard et al. | Dec. 31, 1957 |
| 2,859,256 | Hess et al. | Nov. 4, 1958 |
| 2,882,243 | Milton | Apr. 14, 1959 |

OTHER REFERENCES

Chemical and Engineering News, volume 32, Nov. 29, 1954, page 4768.